(12) United States Patent
Pearcey

(10) Patent No.: US 7,737,941 B2
(45) Date of Patent: Jun. 15, 2010

(54) MOUSE-SHAPED RESPONSIVE PUNCHING DEVICE

(76) Inventor: Dale Pearcey, P.O. Box 1509, Durango, CO (US) 81302

( * ) Notice: Subject to any disclaimer, the term of this patent is extended or adjusted under 35 U.S.C. 154(b) by 1464 days.

(21) Appl. No.: 11/068,450

(22) Filed: Feb. 28, 2005

(65) Prior Publication Data

US 2005/0212762 A1 Sep. 29, 2005

Related U.S. Application Data

(60) Provisional application No. 60/555,735, filed on Mar. 24, 2004.

(51) Int. Cl.
*A63H 3/28* (2006.01)
*A63H 33/26* (2006.01)
*G09G 5/00* (2006.01)

(52) U.S. Cl. .................. 345/156; 446/184; 446/491

(58) Field of Classification Search ......... 345/163–167, 345/156; 446/81, 297, 397, 370, 220, 183–185, 446/484, 485, 491; 472/98
See application file for complete search history.

(56) References Cited

U.S. PATENT DOCUMENTS

| | | | | |
|---|---|---|---|---|
| 3,933,354 A | * | 1/1976 | Goldfarb et al. ............ 273/445 |
| 5,089,741 A | * | 2/1992 | Park et al. ................... 310/332 |
| 5,245,146 A | * | 9/1993 | Florence ..................... 200/333 |
| D343,392 S | * | 1/1994 | Harden et al. .............. D14/403 |
| 5,733,193 A | * | 3/1998 | Allard et al. .................... 463/8 |
| 5,803,877 A | * | 9/1998 | Franey ......................... 482/83 |
| D400,194 S | * | 10/1998 | Leifer ........................ D14/403 |
| 5,895,308 A | * | 4/1999 | Spector ....................... 446/397 |
| 5,902,166 A | * | 5/1999 | Robb ........................... 446/47 |
| 6,099,934 A | * | 8/2000 | Held ........................... 428/100 |
| D434,415 S | * | 11/2000 | Levey et al. ................ D14/403 |
| 6,304,252 B1 | * | 10/2001 | Elledge ....................... 345/179 |
| 6,429,851 B1 | * | 8/2002 | Vaghefi et al. ............... 345/163 |
| 6,544,099 B2 | * | 4/2003 | Shafik ......................... 446/404 |
| 6,672,932 B1 | * | 1/2004 | Panec et al. ................. 446/185 |
| 6,798,398 B2 | * | 9/2004 | Smith et al. ................. 345/163 |
| 7,014,526 B1 | * | 3/2006 | Chamberlin ................ 446/404 |

OTHER PUBLICATIONS

S. Bader et. al., Whac-a-Mole, Things That Think, 11 pages, Spring 2003.

* cited by examiner

*Primary Examiner*—Amare Mengistu
*Assistant Examiner*—Robert R Rainey

(57) ABSTRACT

A responsive novelty punching device for use in amusement and the relief of frustration or aggression of computer users, wherein the responsive novelty punching device contains stored audio responses and means for broadcasting the audio responses when the user strikes the responsive novelty punching device. Audio responses will cycle through a variety of languages for amusement and educational purposes, and for the production efficiencies in the case of international distribution and sales. The responsive novelty punching device also contains connectivity means for communicating data to or from a computer, and affixing means for attaching the responsive novelty punching device to a horizontal surface such as a desk. The responsive novelty punching device can be formed in any of a variety of computer-like shapes for use as a "scapegoat" for computer user frustration and will be encased in a resilient, energy-absorbing material to withstand many blows without losing its shape.

9 Claims, 3 Drawing Sheets

MOUSE-SHAPED RESPONSIVE PUNCHING DEVICE

CROSS-REFERENCE TO RELATED APPLICATIONS

This application is based on U.S. Provisional Patent Application No. 60/555,735 filed by applicant on Mar. 24, 2004, the benefit of which is herein claimed.

BACKGROUND AND FIELD OF THE INVENTION

This invention relates to punching bags, stress relief aids and novelty items for the purpose of providing entertainment, or venting frustration and aggression in a non-damaging therapeutic way, and providing an educational tool.

Computer users sometimes become frustrated in the operation of their computer due to drop-off from the internet, a window pop-up constantly appearing with instructions that the user does not understand, or a program interrupting the entry of lengthy data or typing of a letter and thereby causing a loss of entered data. Users have few opportunities to vent their frustrations and may become frustrated, irritable and angry. In the past, some users have taken their anger out on the computer causing damage thereto or vented their ire on a nearby co-worker.

SUMMARY OF THE INVENTION

This invention is comprised of a punching or striking device in the shape of a computer, computer monitor or computer peripheral wherein an impact detection means within the punching bag device operates an electronic circuit to play a series of pre-recorded responses. Thus when the user becomes frustrated with his or her computer they may strike the responsive punching device to alleviate frustration and the device then responds with prerecorded digital voice statements that provoke humor or satisfaction for the user. The device could incorporate light emitting diodes to simulate computer activity and could also include a mechanical noisemaker for the impact sound. The punching bag device can be constructed from any of a variety of durable materials including leather, urethane, nylon or other outer shell materials that are durable enough to withstand repeated impacts but yielding enough to avoid injury to the user. A padding means within the outer shell may be present to protect the electronic components within and to maintain or return to the original shape of the punching bag device, and to further protect the user from injury. This padding means could be a closed cell foam or other similar material that retains shape, possesses a fair degree of resiliency yet yields to physical blows. The responsive punching device could be formed in a variety of shapes to include different brands and types of computers including notebook computers, or merely resemble a whimsical version of a computer peripheral such as a mouse pointing device that appears to look like a mouse. A means for affixing the punching bag device to a desk would be incorporated so it would not leave the desk upon being struck. Such means may take the form of suction cups or rubberized feet to prevent sliding. The voice responses would be stored on any of a variety of common integrated circuits for such purposes within the punching device. These circuits are commonly known to those in the electronics arts and will not be described in detail here. An electronic switch means or piezo type device will be employed to detect the blow from the user and signal the voice circuit to transmit either a fixed response, a random response, or a combination of a fixed response and a random response, for instance the sound of breaking glass on every blow, followed by a random voice response.

Because the average computer user is likely to work in an office environment the responsive punching device could contain an additional novelty and educational element that will appeal to the average computer user by incorporating random voice responses in multiple languages, thus over time one could learn some few words of foreign languages. This also allows the same device to be sold in multiple countries without changing hardware or software thus increasing the production efficiency of the product.

In one embodiment of the invention, the responsive punching device would contain means for recording user generated responses through a microphone means that would then be added to the play back. In another embodiment of the invention, the responsive punching device could contain a means for connectivity to a computer such as a USB port, or a wireless technology such a Blue Tooth, allowing the user to download new libraries of digital responses to the responsive punching device. This would also allow the responsive punching device to act as a computer peripheral for sending input to a computer and receiving output from a computer, for instance the ability to operate software on the computer every time the responsive punching device is activated.

The present embodiments, described in the foregoing, satisfies the need within the art by providing a responsive punching device which allows the user to vent frustration or aggression away from the computer onto the punching bag device where an immediate audible response provides a calming satisfaction and a humorous response to aid in reducing tension or frustration in the workplace and an educational feedback.

OBJECTS AND ADVANTAGES

Accordingly, several objects and advantages of the invention are listed below:

(a) It is one object of this invention to reduce the stress and frustration of computer users through a healthy physical outlet of anger;
(b) It is another object of this invention to create humor in an office environment;
(c) It is another object of this invention to facilitate the learning of vocabulary in a foreign language;
(d) It is another object of this invention to alleviate the damage to computers caused by extreme user frustration;
(e) It is another object of this invention to offer the tactile and sensory benefits of an actual, physical "Scapegoat" for computer user frustration;
(f) Another object of this invention is the economic benefit the producers of novelty items by allowing one edition of software and firmware to be employed in multiple countries through the multi-lingual output of the invention.

LIST OF REFERENCE NUMERALS

Figure 1:
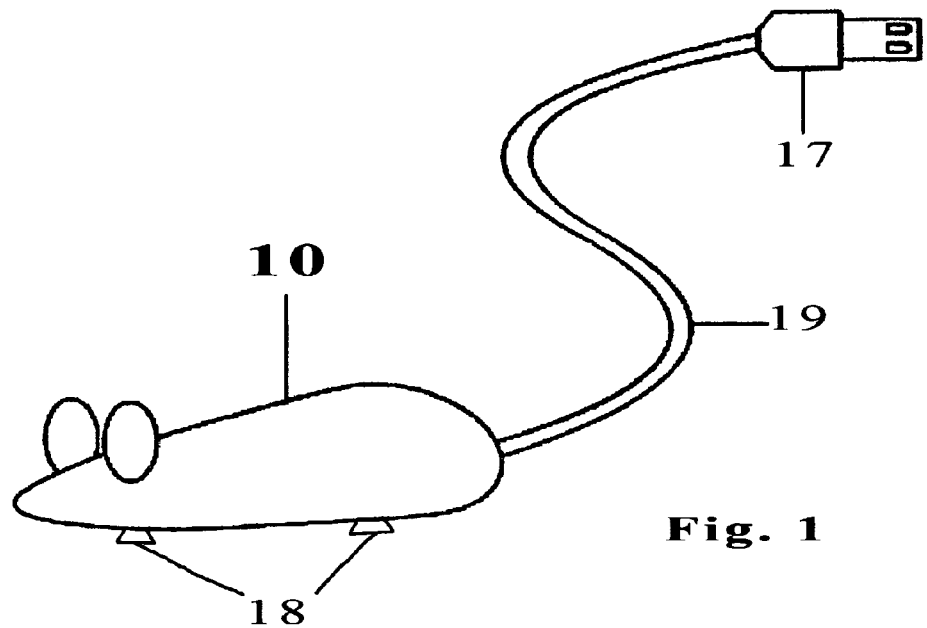
FIG. 1 shows an exterior profile view of a responsive punching device.

The major components of the novel punching device are listed below, with the numberal corresponding to the numerals in the drawings.

10 A punching device
11 An electronics enclosure
12 Electrical leads
13 An impact detection element
14 Logic element
15 Audio output unit
16 One or more batteries
17 An optional connectivity port (USB adapter)
18 Standoffs or Suction cups
19 An electrical cord
20 Light emitting diode (LED)
21 Mouse shaped member

DESCRIPTION OF PREFERRED EMBODIMENTS

Now turning to the drawing, and more particularly FIG. 1 thereof, it will be observed that it depicts at 10 one typical embodiment of a responsive punching device comprising an outer case or shell of a resilient, energy-absorbing material such as nylon or polyurethane, though different materials can be utilized. Elements 18, here are affixing means, such as suction cups, for securing device 10 to the horizontal surface of a desk. Cord 19 provides for electrical connection between the device 10 and a USB connector 17.

Figure 2:
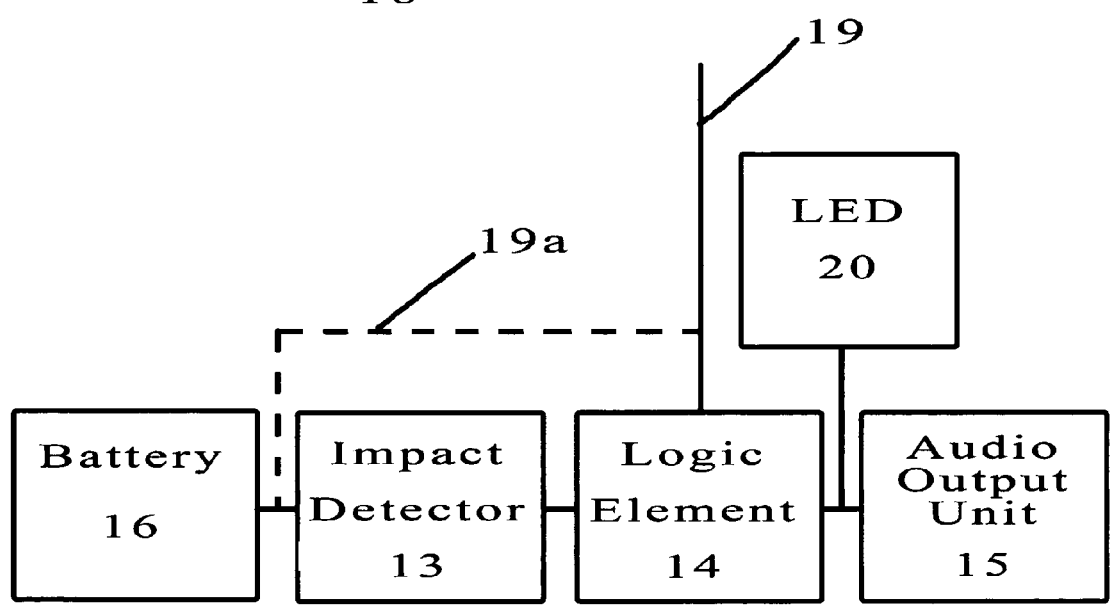
FIG. 2 shows a block diagram of the electronic components.

FIG. 2 depicts the responsive punching device with electronic components explained through use of block diagram. The block diagram, beginning on the left, is comprised of one or more batteries 16, an impact detection element 13, a logic element 14, an audio output unit 15, and a cord 19 for connecting to an optional connectivity port 17. Dotted line 19a represents an electrical lead connecting electrical power from a computer via USB connector 17 and cord 19 in lieu of using battery power.

The impact detection element 13 may take the form of an activation switch, as for example, a steel ball contactor that moves to complete the electrical power circuit upon the punching device 10 receiving an impact. That is, the jarring caused by an impact will cause the suspended ball to momentarily complete the electrical circuit between the battery input side of the switch and the signal output side of the switch. The switch contactor of detection element 13 upon closing of the switch will initiate a playing back of at least one prerecorded message, while each contact closure subsequent to the completion of a playback of a prerecorded message will effect sequencing of the system to the next prerecorded message or randomly select the next prerecorded message.

The logic element 14 is comprised of a miniature integrated circuit for storage and encoding of data such as digital voice recording and may be "Read Only" or "Read/Write" depending on the specific embodiment. The integrated circuit outputs uninterruptedly a prerecorded message upon closure of the activation switch in impact detection element 13. It has sufficient capacity to store at least five prerecorded messages of five to ten seconds each. During playback of a prerecorded message, circuits in logic element 14 or detection element 13 preclude responding to a further detection of an impact by detection element 13. The prerecorded messages may be in different languages.

Audio output unit 15 optimally includes a 0.25 watt speaker mounted at the bottom of device 10 and facing downward. Standoffs 18 maintain an air gap of no less than one-eighth inch between the bottom of the device 10 and the surface upon which the device 10 is to be placed in order to facilitate volume and clarity of the audio output. Audio output unit 15 receives voice input signals from the logic element 14.

Figure 3:
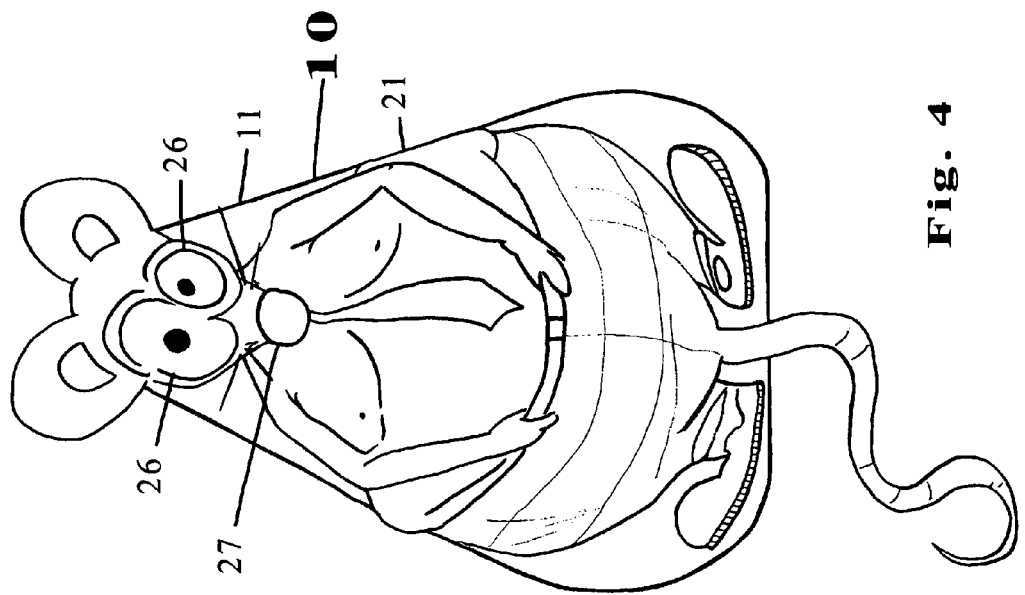
FIG. 3 is a side view illustratively showing the arrangement of components of a mouse shaped punching device.

FIG. 3 is a side view of an embodiment of the invention whereat punching device 10 comprises an air filled rubber mouse shaped member 21 attached or secured to the upper surface of an electronic enclosure 11. The interior of mouse member 21 consists of an air filled chamber 22 functioning as a primary shock absorber protecting the components inside of electronic enclosure 11. The air filled chamber 22 serves as the padding means previously herein above described. Predominant features of mouse shaped member 21 include a tail and a head with eyes and a nose. The rubber material of which the exterior shell of the mouse member is constructed is sufficiently elastic and resilient to allow the eyes, nose and tail to bulge when the mouse is struck by a user's fist and to return to their original shape after being struck. In the mouse eyes and at the back of the head adjacent the LEDs are areas 23 that are sufficiently transparent or clear to allow light from the LEDs to pass through the head and out of the eyes.

Figure 5:
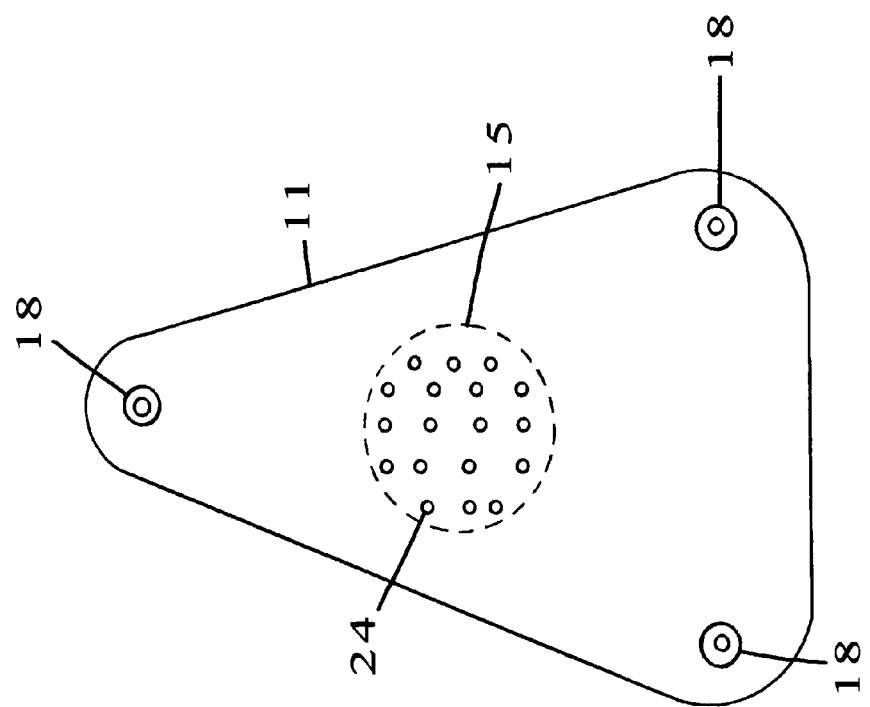
FIG. 5 represents a bottom view of the device shown in FIGS. 3 and 4.

Electronics enclosure 11 is constructed of plastic, metal or other rigid material for housing electronic components 13-16. As shown in FIG. 3 and FIG. 5, three standoffs 18, e.g., either rubberized feet 18a or suction cups 18b, at the bottom wall 11b of the enclosure support the electronic enclosure 11 and the device 10 as a whole. These standoffs are of a height to maintain an air gap of no less than one-eighth inch between the bottom wall 11b and any supporting surface upon which the device 10 is disposed. In addition, standoffs 18 act as secondary shock absorbers. The bottom wall 11b has a plurality of apertures 24 disposed in an area where a speaker of the audio output unit 15 is disposed within the enclosure. In an upper surface 11a of enclosure 11 there are formed one or two recesses for holding LEDs 20. The LEDs may be activated upon impact of the device 10, or may alternatively be arranged to be directly powered by batteries 16 via a flasher circuit so as to continuously simulate computer activity. LEDs 20 are in alignment with the transparent areas 23 of the mouse so that upon activation, any light emitted by the LEDs passes through the mouse and exits at the area of the mouse eyes.

Within enclosure 11 are a battery compartment for receiving one or more batteries 16, impact detector 13 for sensing an impact and activating a logic circuit 14, a logic circuit 14, audio output unit 15 for outputting a verbal statement in response to receiving signals from logic circuit 14, and electrical leads 12 for carrying power and signals between the various components. Here logic circuit 14 may comprise a chip AP18108A produced by A Plus Inc. The impact detector 13 includes a U-shaped plastic tube 13a containing a conductive metal ball 13b loosely lying in the bottom of the U and two electrical leads extending into one end of the tube. Upon sensing an impact, the ball will pop up and momentarily complete a conductive path between the two electrical leads, i.e. close the circuit between the battery 16 and the logic element 14 to thereby initiate playback of prerecorded audio statements.

In the FIG. 3 embodiment, the mouse shaped member 21 may be provided with an integral skirt, see dotted line 25, extending from its back so as to form a triangular shaped cavity for receiving the triangular shaped electronics enclosure 11 therein. This combination of mouse shaped member 21 and electronic enclosure 11 provides for a more stable construction than one where the mouse shaped member is secured to the upper surface of the electronic enclosure.

Another modification has an impact detection unit 13 comprised of a tilt-sensitive mercury or mercury-like switch for sensing an impact on the mouse shaped member 21. Upon jarring of the switch by the device 10 receiving an impact, continuity between the switch contacts would be established by the flow of the mercury or mercury-like material.

Figure 4:
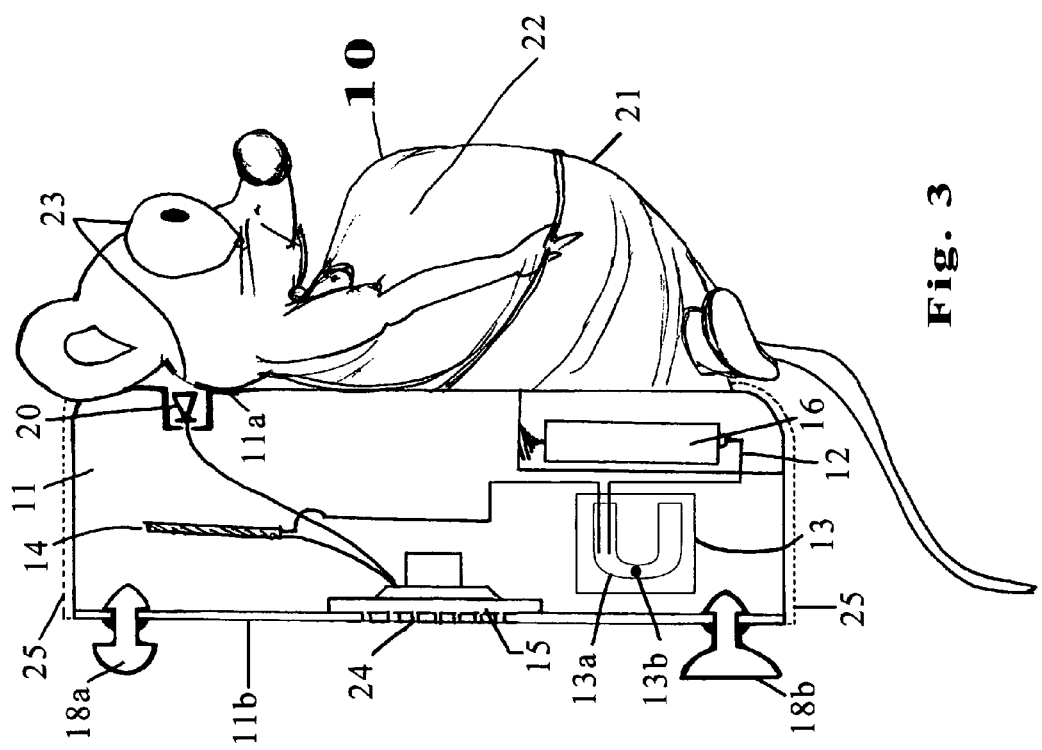
FIG. 4 is a top view illustrating characteristic features of the mouse shaped embodiment of the invention.
Figure 6:
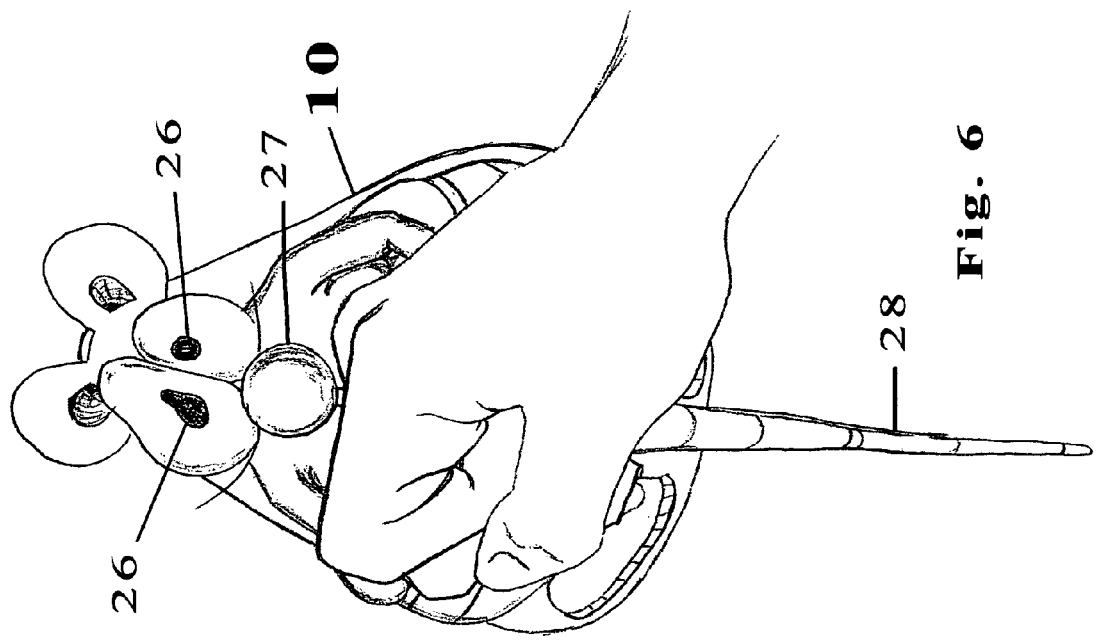
FIG. 6 illustrates user activation of the mouse shaped punching device.

FIG. 4 is a top view of the device 10 and shows predominant facial features, such as eyes 26 and nose 27, as well as the body shape of mouse shaped member 21. The FIG. 5 bottom view depicts the triangular shape of the electronic enclosure 11, the spaced locations of the three standoffs 18, the area of the apertures 24, and, by the dashed lines, the location of the speaker of unit 15 within enclosure 11. FIG. 6 illustrates the device 10 in the form of a mouse shaped member 21 being impacted by the fist of a user. Upon impact, the eyes 26, nose 27 and tail bulge 28, the eyes light up and an audio output is generated.

CONCLUSION, RAMIFICATIONS AND SCOPE OF INVENTION

Thus the reader will see that punching device of this invention provides a new and highly effective alternative means for reducing computer user stress, the generation of natural endorphins by vigorous physical output, and the creation of office amusement and humor. Additionally, the punching bag device allows the learning of vocabulary in foreign languages.

While the above description contains certain specifics, it should not be construed as a limitation upon the described invention, but merely as providing illustrations of certain currently preferred embodiments. Thus the scope of the invention should be determined by the appended claims and their legal equivalents, rather than by the examples given.

What is claimed is:

1. A punch responsive device comprising in combination a mouse shaped member attached to and supported by an electronic enclosure, wherein:

said mouse shaped member comprises an exterior resilient shell and an interior shock absorbing air chamber within said exterior resilient shell, said exterior resilient shell including a mouse head portion with eyes and transparent areas in said exterior shell located at parts of the mouse eyes and in the back of the head portion, said electronic enclosure has a bottom wall with a plurality of shock absorbing spaced standoffs secured thereto for supporting said device on a planar surface and a plurality of apertures within an area circumscribed by said plurality of spaced standoffs, said electronic enclosure has an upper surface supporting thereon a pair of light emitting diodes in alignment with said transparent areas in said head portion of said mouse shaped member, said electronic enclosure containing therein one or more batteries, an impact responsive switching device, an integrated logic circuit with a plurality of stored prerecorded messages that are played back upon receipt of a signal from said impact responsive switching device, an audio output unit including a speaker disposed adjacent said plurality of apertures for broadcasting the played back prerecorded messages and electrical connecting means for operatively connecting said one or more batteries, said impact responsive switching device, said integrated logic circuit, said audio output unit and said light emitting diodes whereby said punch responsive device upon detection of an impact thereon provides one of said prerecorded messages as an audio output from said speaker and light outputs from said light emitting diodes, wherein said mouse shaped member has a back side that includes said back of the head portion with transparent areas and a front side that includes said mouse head portion with eyes, said mouse shaped member being supported on said back side on said electronic enclosure with said front side facing upward, whereby said mouse shaped member faces upward and light emitted from said light emitting diodes on said upper surface of said electronic enclosure traverses the transparent areas in the back of the head portion, the head portion interior and out of said eyes, and said plurality of shock absorbing spaced standoffs for supporting said device on a planar surface support said device on a planar surface that is horizontal, wherein said eyes bulge upon said mouse shaped member receiving a blow.

2. A punch responsive device as in claim 1 wherein said standoffs are of a resilient rubber material that absorbs some of the shock from an impact and are of a sufficient height to space said bottom wall at least one-eighth inch from any planar surface on which said punch responsive device is disposed to provide for an audio output of ample clarity and volume.

3. A punch responsive device of claim 1 wherein said plurality of prerecorded messages includes at least one message in a language that is different from the language of the remaining messages.

4. A punch responsive device of claim 1 wherein said exterior resilient shell includes a skirt forming a cavity receiving said electronic enclosure.

5. A punch responsive device of claim 1 wherein said exterior resilient shell of said mouse shaped member has a nose and a tail, and said nose and tail bulge upon said mouse shaped member receiving a blow.

6. A punch responsive device as in claim 1 wherein said upper surface supporting thereon a pair of light emitting diodes has recesses wherein said light emitting diodes are disposed.

7. A punch responsive device as in claim 1 wherein said mouse shaped member with said front side facing upward presents an upward facing punch receiving surface area for receiving the physical impact of a punch from the bottom of the fist of a frustrated computer user, and said exterior resilient shell includes a skirt forming a cavity receiving said electronic enclosure to thereby provide enhanced stability for said combination.

8. A punch responsive device as in claim 7 wherein said plurality of shock absorbing spaced standoffs are of a resilient rubber material and are of a sufficient height to support said bottom wall at least one-eighth inch above said planar surface to provide for an audio output of ample clarity and volume.

9. A punch responsive device as in claim 8 wherein said plurality of stored prerecorded messages includes at least one message in a language that is different from the language of the remaining messages.

* * * * *